INVENTOR.
CLARENCE W. TYDEMAN
ATTORNEY

July 11, 1961  C. W. TYDEMAN  2,991,761
HYDRAULIC CONTROL VALVES
Filed Sept. 6, 1957  4 Sheets-Sheet 2
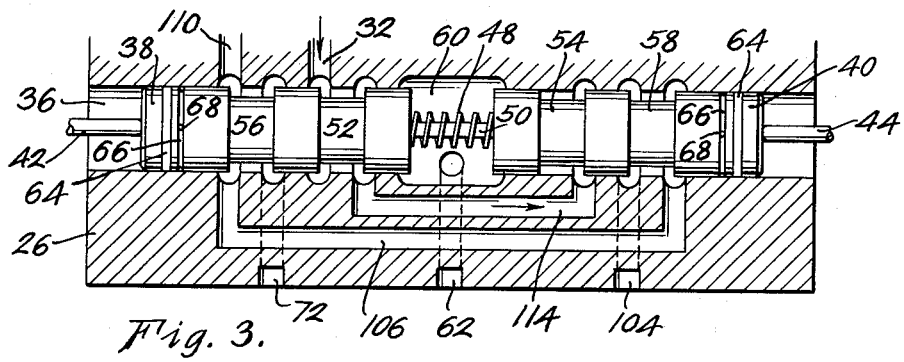
Fig. 3.
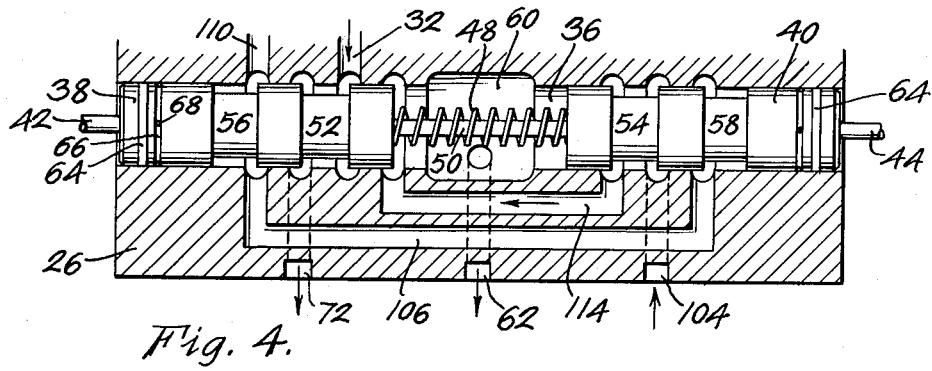
Fig. 4.
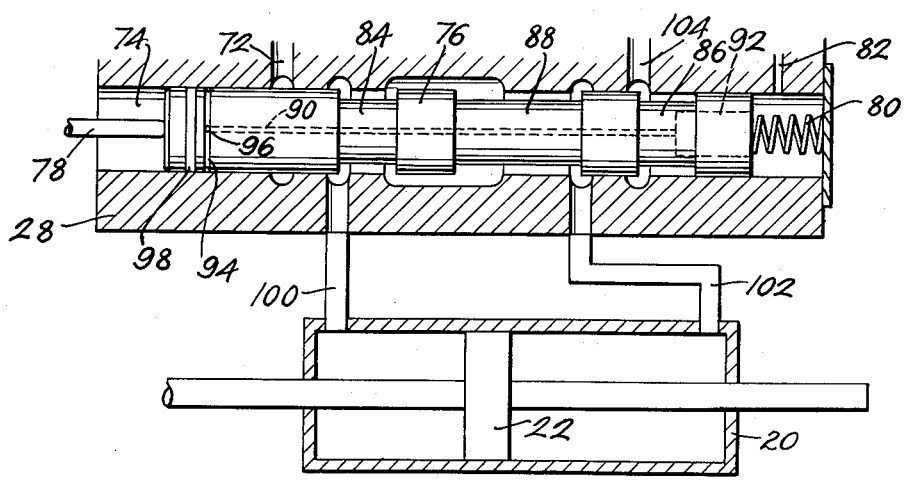
Fig. 5.
INVENTOR.
CLARENCE W. TYDEMAN
ATTORNEY July 11, 1961
C. W. TYDEMAN
2,991,761
HYDRAULIC CONTROL VALVES
Filed Sept. 6, 1957
4 Sheets-Sheet 3
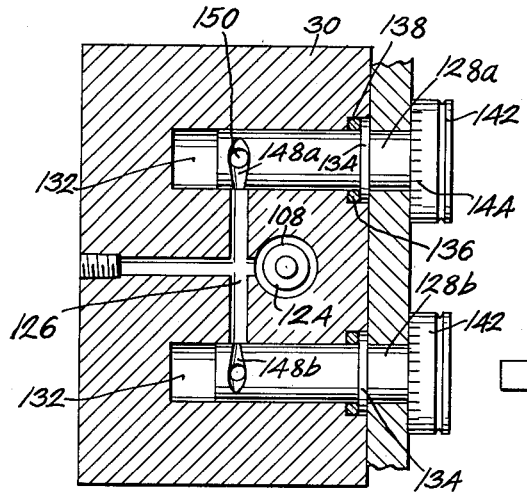
Fig. 6.
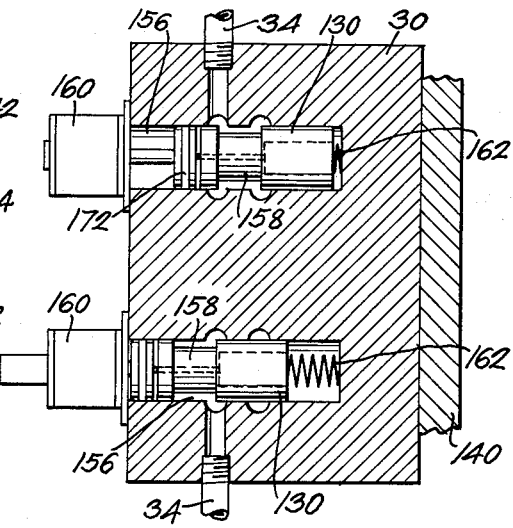
Fig. 7.
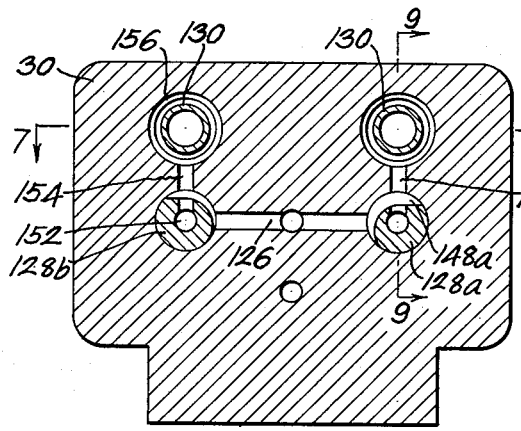
Fig. 8.
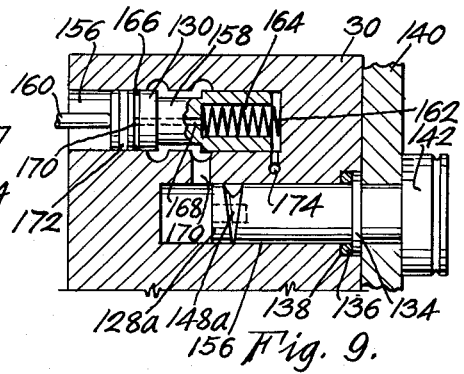
Fig. 9.
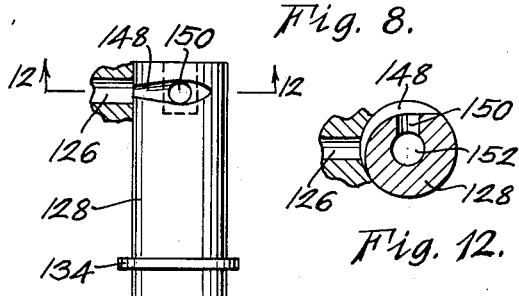
Fig. 11.    Fig. 12.    Fig. 10.
INVENTOR.
CLARENCE W. TYDEMAN
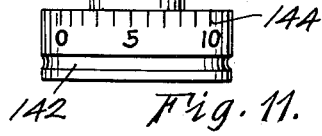
ATTORNEY

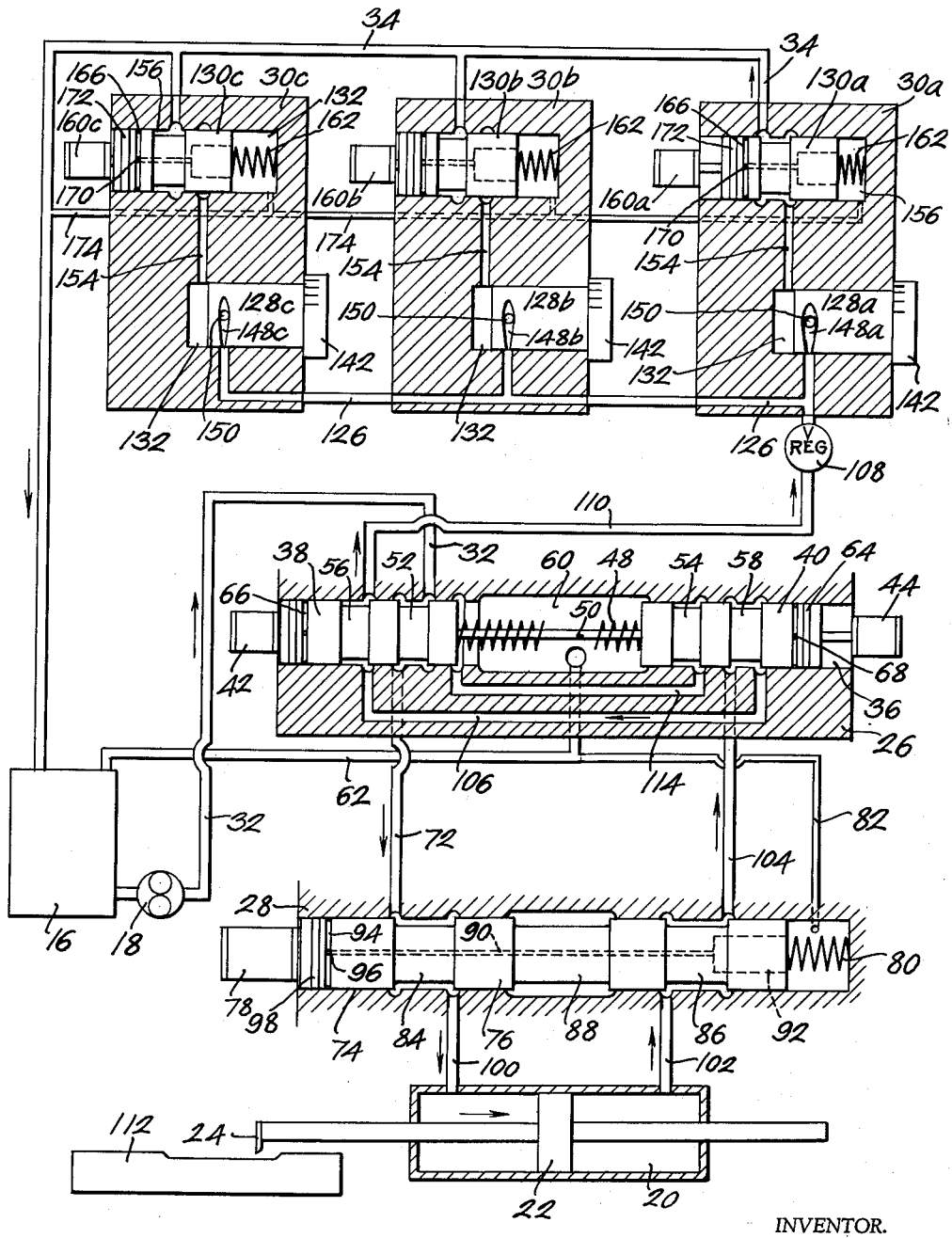

United States Patent Office 2,991,761
Patented July 11, 1961

2,991,761
HYDRAULIC CONTROL VALVES
Clarence W. Tydeman, 900 Broadway,
Redwood City, Calif.
Filed Sept. 6, 1957, Ser. No. 682,351
12 Claims. (Cl. 121—45)

This invention relates to improvements in machine tool feed control valves and, more particularly, to hydraulic control valves of the type shown and described in my copending applications Serial Number 324,805, now abandoned; Serial Number 379,667, now U.S. Patent 2,765,-808; and Serial Number 346,329, now U.S. Patent 2,830,289.

Hydraulic control valves of the general type that form the subject matter of the instant application and my copending applications, above identified, are used primarily to accomplish precision automatic or semi-automatic control over the movements of machine tools such as boring mills, turret lathes, shapers and other equipment adaptable for hydraulic operation. The accuracy of the machining operation that can be accomplished with hydraulically-operated machines is, of course, dependent in large measure upon the degree of control the control valve is capable of providing over the fluid entering and leaving the hydraulic cylinder to which the tool is attached. Needless to say, leakage of fluid past the components of the valve, fluctuations in pressure and any lost motion or time lag in the control system is a serious deficiency which affects the precision attainable in the finished product. In this respect, I have noted certain deficiencies in the valve which forms the subject matter of my Patent No. 2,830,289 that limit its effectiveness in some areas of operation.

In the above noted application, I disclose a hydraulic machine tool control valve incorporating two independently actuated directional control elements of the spool type which function to change the direction of movement of the piston and, therefore, the tool depending therefrom. In one mode of operation, I am able to stop the piston and place the tool in stand-by condition at any point in the operating cycle, both forward and reverse, by merely actuating both directional control spools in a manner to shut off the supply of hydraulic fluid to both ends of the hydraulic cylinder simultaneously. At the same time, I close any open feed control spools that function to regulate the rate of feed of the piston and tool associated therewith. My former construction was such, however, that although I could close the feed control spools and maintain the high fluid pressure in the system up to that point, my bleed cocks were located beyond or downstream of the feed spools and were open to atmospheric pressure at the sump. Thus, with the directional spools energized to place the piston in stand-by position and the feed spools closed, the fluid in the passages interconnecting the feed spools and bleed cocks tends to drain leaving a void or pocket in the hydraulic system. As a result, when the valve is again activated to move the piston, fluid must rush past the open feed spool to fill the void that exists between it and the associated bleed cork thereby causing a momentary drop in line pressure and erratic, jerking movement of the tool until the lines fill with fluid and the pressure is restored.

I also found that I was unable to control the rate of movement of the tool when the feed spool controlling rapid traverse on both the feed and return strokes was energized to by-pass the bleed cocks. Occasions do arise, however, when normal feed rates are too slow and uncontrolled rapid traverse is too fast; whereupon, some intermediate feed rate becomes highly desirable.

Finally, I noticed that under certain operating conditions it would be of considerable advantage to be able to move and position the tool manually rather than have to depend upon the hydraulic control system to accomplish all movements thereof. Although one of my earlier valve designs provided means for placing the piston in standby condition, none of them were constructed to both place the piston in standby position and render it freely movable within the cylinder so that it could be relocated manually.

It is, therefore, the principal object of the present invention to provide an improved hydraulic machine tool control valve.

A second object is the provision of a hydraulic control valve for use in regulating the movements of machine tools that incorporates a feed selection section that does away with fluctuations in fluid pressure, prevents drainage of the fluid from between the feed spools and bleed clocks, and eliminates the erratic movement of the tool.

Another object is to provide a control valve that includes means for regulating the feed rate of the tool in rapid traverse, both forward and reverse.

An additional object of the invention is to provide a hydraulic feed control system for machine tools that incorporates a by-pass valve which functions upon actuation to place the piston in a free-floating condition within the hydraulic cylinder so that it can be positioned manually.

Further objects are to provide a solenoid-actuated hydraulic machine tool control system that is compact, rugged, dependable, easy to operate, capable of automatic or semi-automatic control with a high degree of precision, and adaptable for use with a wide variety of machines.

Other objects will be in part apparent and in part pointed out specifically hereinafter in connection with the description of the drawing that follows, in which:

FIGURE 3 is an enlarged fragmentary vertical section similar to FIGURE 2 but showing the directional spools energized to place the piston in standby condition;

FIGURE 4 is an enlarged fragmentary vertical section similar to FIGURES 2 and 3 but illustrating the directional spools de-energized to provide rapid return feed of the piston;

FIGURE 5 is an enlarged fragmentary vertical section showing the by-pass spool of the control valve energized to place the piston in a free-floating condition within the hydraulic cylinder;

FIGURE 6 is a horizontal section taken along line 6—6 of FIGURE 1 showing the bleed cocks and associated operating knobs in detail;

FIGURE 7 is a horizontal section taken along line 7—7 of FIGURE 8 illustrating the feed control spools in detail;

FIGURE 8 is a vertical section of the feed control system of the valve taken along line 8—8 of FIGURE 1;

FIGURE 9 is a vertical fragmentary section of the feed control system taken along line 9—9 of FIGURE 8;

FIGURE 10 is an enlarged fragmentary elevation of one of the knobs used to control each bleed cock with its associated fixed index;

FIGURE 11 is an enlarged fragmentary plan view, portions of which are in section, illustrating the bleed cock in detail and the control knob operatively coupled thereto;

FIGURE 12 is an enlarged fragmentary section of the bleed orifice and its connecting inlet and outlet passages; and, FIGURE 13 is an elevational view part of which is shown in vertical section and other parts diagrammatically of the entire hydraulic control system arranged for controlled feed during a rapid return stroke.

Figure 1:
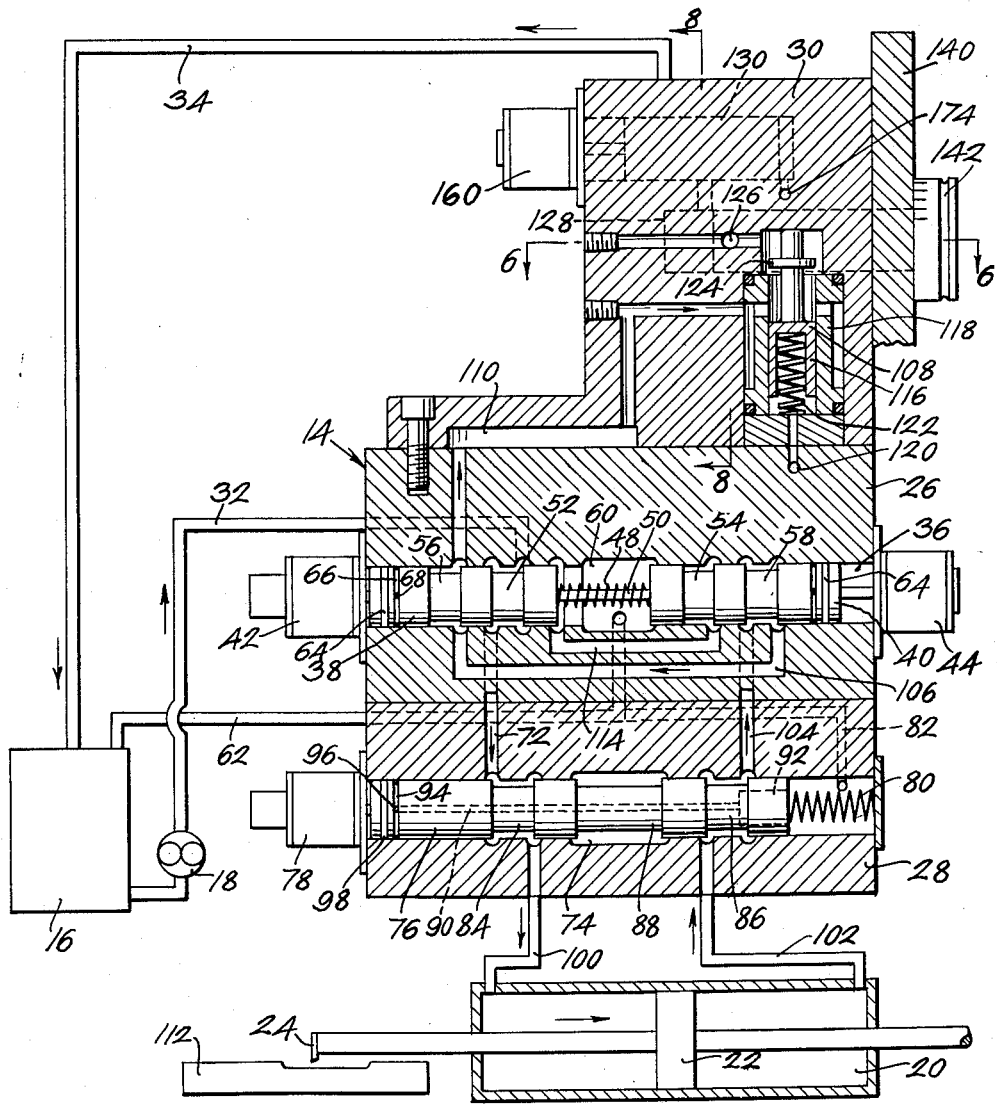
FIGURE 1 is a side elevation of the hydraulic machine tool control valve of the present invention and its associated components, portions thereof having been shown in vertical section and other portions having been illustrated somewhat diagrammatically.

Referring now to the drawing, and more particularly to FIGURE 1 thereof, the hydraulic machine tool control valve of the present invention, indicated in a general way by numeral 14, will be seen to be connected in series with a sump or other source of hydraulic fluid 16 and a suitable high-pressure pump 18 which cooperate to circulate the fluid through the valve and through hydraulic cylinder 20 connected in parallel with the valve. The sole function of the valve 14 is, of course, to control the direction and rate of flow of fluid through the cylinder 20 thereby controlling the movements of piston 22 and the tool 24 connected thereto.

The valve 14 is divided into three main sections, namely, a directional control section 26, a by-pass section 28 and a feed control section 30. During all settings of the valve in which there is positive feed control over the movements of the tool, fluid is withdrawn from the sump and the pump forces it under high pressure through intake line 32 into the directional control section where it passes through the by-pass section into one end of the cylinder, out the other end and back through the by-pass and directional control sections to the feed control section which exhausts the fluid to the sump through drain line 34.

Figure 2:
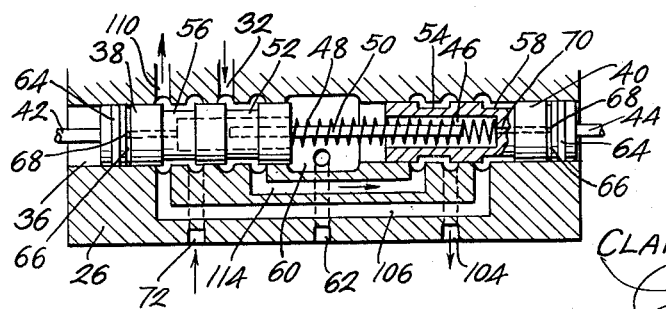
FIGURE 2 is a fragmentary vertical section showing the directional control spools of the valve position for forward feed.

The directional control section 26 of the valve body will be seen to include a longitudinal bore 36 in which two directional control spools 38 and 40 are mounted for axial slidable movement. Conventional solenoids 42 and 44 are attached to the valve body at opposite ends of bore 36 and are operatively coupled with directional spools 38 and 40, respectively, to effect axial movement thereof. In the specific arrangement shown, the directional spools are axially aligned and formed to provide opposed sockets 46, one of which is shown in FIGURE 2, in adjoining inner ends thereof which receive a compression spring 48 and an aligning member 50 that cooperate to urge the spools apart except when one or both of the solenoids 42 and 44 are energized. As illustrated, directional spools 38 and 40 are identical in construction and each includes axially spaced sections of reduced diameter, the inner reduced sections having been indicated by numerals 52 and 54, respectively; whereas, the outer reduced sections have been designated 56 and 58, respectively. Except for the reduced sections of the directional spools identified above, the remaining portions lie in substantially liquid-tight sealed engagement with the wall of the valve body defining the bore although the spools are freely slidable therein. The central section 60 of bore 36 which lies between the directional spools is connected directly to the sump by by-pass drain line 62, the function of which will be set forth in detail in connection with the description of FIGURE 4. The outer ends of each directional spool are provided with O-ring seals 64 and an annular bleed groove 66 located between the outer reduced section and the O-ring seal. Any fluid leaking past the directional spools in the direction of the outer ends thereof, is conducted to the sump through radial passage 68 in the bottom of the bleed groove and axial passages 70, shown in FIGURE 2, that connect with the central section of the bore thereby preventing the high-pressure fluid from contacting the seals.

When the directional spool 38 is in the de-energized position of FIGURES 1, 4 and 13, reduced section 52 thereof connects intake line 32 with passage 72 which opens into bore 74 of by-pass section 28 that contains by-pass spool 76 mounted in the bore for slidable movement. Spool 76 is operated by solenoid 78 and compression spring 80 in the closed end of the bore functions to return spool 76 to its inoperative or deenergized position shown in FIGURES 1 and 13. The end of bore 74 in which spring 80 is mounted is connected to the sump through passage 82 and line 62. The spool 76 is provided with spaced outer sections 84 and 86 of reduced diameter and a central section of reduced diameter 88 therebetween. The by-pass spool also contains an axial passage 90 interconnecting the spring socket 92 in one end with the bleed groove 94 and associated radial passage 96 in the other that conduct fluid leaking past the spool to the sump before it contacts the O-ring 98. With by-pass spool 76 inoperative or de-energized, as in FIGURES 1 and 13, reduced section 84 thereof connects passage 72 with line 100 opening into the forward end of cylinder 20 which, of course, forces the piston rearward through its return stroke as indicated by the arrow inside the cylinder.

The fluid discharged from the rear end of the cylinder passes through line 102 and through reduced section 86 at the other end of the by-pass spool into passage 104 which opens into outer reduced section 58 of directional spool 40 when said spool is energized as in FIGURES 1, 3 and 13. Reduced section 58, in this energized position, connects passage 104 with passage 106 that opens into outer reduced section 56 of directional control spool 38 when it is de-energized and permits the fluid to pass to pressure regulator 108 through line 110 which also opens into section 56. Thus, with the directional spools and by-pass spool positioned as in FIGURES 1 and 13, the fluid from the sump moves into the directional control section 26 through spool 38 therein, into the by-pass section 28 past section 84 of by-pass spool 76 and into the forward end of the cylinder. Fluid discharged from the other end of the cylinder moves again into the by-pass section through section 86 of the by-pass spool, thence through section 58 of directional spool 40 in the directional control section to section 56 of the other directional spool where it is discharged into line 110 connecting the compensator 108 of the feed control section 30 with the directional control section. In the feed control section 30, which will be described in detail hereinafter in connection with FIGURES 6–13, inclusive, the fluid passes through a pressure regulator or compensator 108, which is of conventional design, to at least one bleed orifice and feed control spool arranged in series which cooperate to regulate the rate of discharge of the fluid to the sump through line 34 thus controlling the feed rate of the tool 24 relative to the work-piece 112 on both the forward and return strokes. Note that by-pass spool 76 in the de-energized position of FIGURES 1 and 13 has no function. Summarizing the foregoing, FIGURES 1 and 13 which show directional spool 38 deenergized, directional spool 40 energized and by-pass spool 76 de-energized illustrate the setting of the valve for the return stroke of the piston and tool when a controlled feed thereof is desired.

In FIGURE 2 it will be seen that directional spool 38 is energized while directional spool 40 has been de-energized which corresponds to the setting of the valve to accomplish controlled forward feed of the piston and tool. The fluid is pumped from the sump through intake line 32 as before; however, passage 72 instead of being connected through section 52 of spool 38 to the inlet is now connected directly to line 110 through outer reduced section 56 thereof. The inlet 32, on the other hand, is placed in communication with passage 114 across the inner reduced section 52 of spool 38 that connects with inner reduced section 54 of spool 40 which, when de-energized, also opens onto line 102. Thus, with the by-pass spool de-energized as in FIGURES 1 and 13, and the directional spools arranged as in FIGURE 2, fluid will move from intake line 32 past section 52 of spool 38, into line 104 through passage 114 and section 54 of spool 40, and past section 86 of by-pass spool 76 where it enters the rear end of cylinder 22 from line 102. The fluid discharged ahead of the cylinder passes out through line 100 and through section 84 of the by-pass spool, and into passage 72 and past section 56 of directional spool 38 to the feed control section 30 via line 110 and compensator 108. Passage 106 is also opened by section 56 of spool 38 to receive fluid from passage 72; however, section 58 of spool 40 at the other end of passage 106 has no outlet and is, therefore, blocked. Accordingly, controlled forward feed is accomplished with directional spool 38 energized, directional spool 40 de-energized and by-pass spool 76 de-energized.

FIGURE 3 shows both directional spools 38 and 40 energized which places inlet line 32 in communication with passage 114 through inner reduced section 52; however, passage 114 opens into inner section 54 which has no outlet when spool 40 is energized thus stopping the piston within the cylinder in a standby condition. In FIGURE 4, on the other hand, both directional spools 38 and 40 are de-energized which corresponds to the uncontrolled rapid return setting of the valve wherein the feed control section 30 thereof is by-passed completely. As in FIGURES 1 and 13, with both directional spool 38 and by-pass spool 40 de-energized, the fluid from inlet line 32 passes freely into the forward end of the cylinder past section 52, passage 72, section 84 and line 100. The fluid discharged from the rear end of the cylinder moves from line 102 past section 86 and into line 104, as before; however, instead of moving into line 106 up to the feed control section, it now passes into passage 114 through inner reduced section 54 of spool 40 which is positioned to cut off passage 106 and connect passages 104 and 114 together. Passage 114 opens at the inner extremity of spool 38 thereby delivering the fluid directly to the sump through central section 60 of bore 36 and line 62. Such an arrangement, of course, does not control the flow of exhaust fluid and permits the tool and piston to return quite rapidly to the point where a new operation begins.

The by-pass spool 76 illustrated in detail in FIGURE 5 constitutes an important improvement over my previous valve constructions as, when energized, it cuts off the cylinder from both passages 72 and 104 of the directional control section thereby preventing all further fluid-actuated movements of the tool irrespective of the settings of the directional control spools at the time the by-pass spool is energized. At the same time, lines 100 and 102 at opposite ends of the cylinder are interconnected by means of outer reduced section 84, central reduced section 88 and enlarged central section 116 of the bore 74 to provide an unrestricted path by which fluid may flow between opposite ends of the cylinder. Obviously, this enables the piston to be moved manually to any desired position. The spools of the directional control and feed control section may be left as they were or changed to any desired arrangement while the by-pass spool is energized and, as soon as the by-pass spool is de-energized, the valve will immediately resume fluid-actuated operation of the tool.

In FIGURE 1 it will be seen that pressure regulator 108 is of a well-known construction and includes a piston 116 mounted for reciprocal movement within a cylinder 118 having one end open through port 120 to the atmosphere. Compression spring 122 operates to hold valve element 124 on the piston rod open so that the fluid can pass from line 110 to bleed manifold 126 unless the fluid pressure on the other end of the piston exceeds a preset maximum; whereupon, the piston closes and valve element 124 seats to shut off the supply of fluid to the bleed manifold until such time as the fluid pressure falls below the regulator setting.

In FIGURE 13 it will be seen that the feed control section 30 of the valve can be further divided into two or more subsections 30a, b and c connected in parallel with one another between the bleed manifold 126 and drain line 34. Each of the subsections of the feed control section includes a bleed cock 128 connected in series with a feed spool 130. The feed spools 130 function to control the movement of fluid through the separate subsections and any one feed spool or any combination thereof may be either open or closed at a given instant depending upon the particular operation being performed by the valve which will be set out in more detail hereinafter. The bleed cocks 128, on the other hand, function to control the volume of fluid passing through a given subsection when the feed spool associated therewith is energized and open. The bleed cocks may also be used alone or in combination to vary the flow rates.

With reference now to FIGURES 6–12, inclusive, it will be noted that the bleed cocks 128 are mounted for rotation within bores 132 formed in the body of feed control section 30. In the particular form shown, each cock 128 includes an annular flange 134 adapted to retain an O-ring seal 136 within annular enlargement 138 on the open end of the bore when face plate 140 is attached to the body. A control knob 142 is attached to each cock on the outer end thereof and is graduated as at 144 to indicate feed rates for any suitable scale relative to a fixed index 146 on the plate. Each cock also includes a bleed orifice 148 on the surface thereof at the point at which the bleed manifold 126 communicates the bore 132. These bleed orifices comprise a V-shaped groove of steadily increasing cross section which functions to regulate the volume of fluid admitted to the feed spool in communication therewith as the cock is rotated relative to the fixed bleed manifold. The scale 144 and fixed index 146 are, of course, calibrated to indicate the amount of fluid being passed by the orifice in any rotarial position of the cock. A bleed port 150 interconnects the bleed orifice 148 with a pocket 152 in the inner end of the cock that opens into the inner end of bore 132. Thus, fluid from regulator 108 passes through the bleed manifold 126, past bleed orifice 148, into port 150 and through pocket 152 into the inner end of bore 136 where it is conducted by passage 154 to bore 156 of the feed spool 130 operatively connected thereto.

The attention is now directed to FIGURES 7 through 9 and 13 wherein the feed spools 130 have been shown in detail. Each feed spool includes an annular section of reduced diameter 158 intermediate the ends thereof which, when the spool is energized, interconnects passage 154 and the drain line or manifold 34. When de-energized on the other hand, these feed selection spools cut off the flow of fluid through one or more subsections of the feed section 30. Each feed spool 130 is operated by a solenoid 160 operatively coupled to one end thereof; whereas a compression spring 162 mounted between the closed end of the bore and the other end of the spool functions to return it to de-energized position. The spring fits into a socket 164 (FIGURE 9) in the inner end of the spool that is connected with annular groove 166 adjacent the outer end by axial passage 168 and radial passage 170 which cooperate to prevent the high pressure fluid from contacting the O-ring seals 172. An auxiliary drain manifold 174 interconnects the inner or closed ends of the bore 156 with the main drain manifold 34 so that the fluid entering the annular grooves 166 will be conducted to the sump.

In FIGURES 6 through 9 and 13 it can be seen that the two or more subsections 30a, b and c of the feed control section differ from one another slightly in that cock 128a of subsection 30a contains a larger bleed orifice 148a and port 150a than the corresponding elements 128b, 128c, 148b, 148c, 150b and 150c of subsections 30b and 30c. Thus, subsection 30a constitutes the rapid traverse portion of the feed control section, whereas, sections 30b and 30c comprise the normal feed portions thereof which can be used singly or connected in parallel with one another to produce a wide range of feed rates. Of course, one or both of subsections 30b and 30c could also be connected in parallel with rapid traverse section 30a to bring about higher than average tool feed rates although this is seldom, if ever, required and can best be accomplished by adding additional normal feed subsections connected in parallel with those shown. The feed spools 130 are the same in all three subsections of the feed control section.

Referring now specifically to FIGURE 13, note that the directional control spools 38 and 40 and by-pass spool 74 are set in the same positions as in FIGURE 1 which, as has already been explained, moves the piston through its return stroke. In the feed section of the valve, normal feed subsections 30b and 30c are closed because feed spools 130b and 130c are in de-energized position; whereas the rapid traverse subsection 30a is open through energized feed spool 130a thus providing for rapid return of the tool. With the improved construction illustrated herein, bleed orifice 148a provides a mechanism by which the rate of rapid traverse can be accurately controlled. If, on the other hand, no feed control during rapid return of the tool is required, both directional spools are de-energized as in FIGURE 4 to by-pass the feed control section entirely. Obviously, with the directional spools set as in FIGURES 1 and 13, normal speed of the tool through the return stroke can be controlled by de-energizing spool 130a and energizing 130b or 130c or both.

To accomplish normal forward feed of the tool, directional spool 38 is energized along with one or both of the normal feed spools 130b or 130c while the rapid traverse feed spool 130a and directional spool 40 are de-energized. The bleed orifices of the operative feed subsections are controlled with the knobs 144 to give the precise feed rate desired. In the same manner, the tool can be moved rapidly through its former stroke by merely using the rapid traverse subsection 30a for control instead of 30b or 30c.

Whenever the directional control spools 38 and 40 are set as in FIGURE 3 to place the piston in standby condition, all of the feed spools 130a, b and c are normally closed. The location of these feed spools 130 downstream of the bleed orifices is important as it maintains a fully pressurized system and prevents fluid from escaping past the bleed orifices when the directional control spools are in standby and the feed spools are all de-energized. Energization of by-pass spools 76, of course, renders the feed and directional control sections inoperative to control the movements of the tool.

Having thus described the several useful and novel features of the hydraulic control valve of the present invention, it will be seen that the several useful objects for which it was designed have been achieved. Although the invention has been described in connection with the specific form thereof illustrated in the accompanying drawings, I realize that certain changes and modifications therein may occur to those skilled in the art within the broad teaching found herein; hence, it is my intention that the scope of protection afforded hereby shall be limited only insofar as said limitations are expressly set forth in the appended claims.

What is claimed is:

1. In a hydraulic device for controlling the movements of machine tools and the like, a source of hydraulic fluid, a valve body including a bore, intake conduit means connected between the source and bore to deliver fluid to the latter, pressure-generating means connected in the intake conduit means to deliver the fluid under pressure, drain conduit means connected between the bore and source to return fluid to the latter, a hydraulic cylinder having a piston mounted for reciprocal movement therein, first and second conduit means connected between opposite ends of the cylinder and the bore to deliver fluid to and receive fluid from opposite sides of the piston, directional control means mounted for reciprocal movement in the bore and operative in one position to interconnect the intake conduit means with the first conduit means and the drain conduit means with the second conduit means, and said directional control means being operative in a second position to interconnect the intake conduit means with the second conduit means and the drain conduit means with the first conduit means, and by-pass means operatively interconnecting the first and second conduit means, said by-pass means being operative in one position to disconnect the first and second conduit means from one another and connect them with the cylinder, and said by-pass means being operative in a second position to connect the first and second conduit means with one another and disconnect them from the bore and source.

2. The device as set forth in claim 1 in which the drain conduit means includes bleed means operative to control the amount of fluid returned to the source and feed control means operative to shut off the return of the fluid to the source, said bleed means and feed control means being connected in series with one another, and said feed control means being located between the source and bleed means.

3. The device as set forth in claim 2 in which the valve body includes a third bore, the drain conduit means is connected through the third bore, and the bleed means comprises a cock having a variable bleed orifice mounted within the third bore and operative upon rotation to deliver varying amounts of fluid to the feed control means.

4. The device as set forth in claim 2 in which the valve body includes a fourth bore, the drain conduit means is connected through the fourth bore, and the feed control means comprises a spool mounted within the fourth bore operative to open and close the drain conduit means.

5. The device as set forth in claim 1 in which the valve body includes a second bore, the first and second conduit means are connected through the second bore, and the by-pass means comprises a spool mounted in the second bore for reciprocal movement.

6. The device as set forth in claim 1 in which the by-pass means in second position is operative to disconnect the intake conduit means and drain conduit means from one another.

7. In a hydraulic device for controlling the movements of machine tools and the like, a source of hydraulic fluid, a valve body including a bore, intake conduit means connected between the source and bore to deliver fluid to the latter, a hydraulic cylinder having a piston mounted for reciprocal movement therein, first and second conduit means connected between opposite ends of the cylinder and the bore to deliver fluid to and receive fluid from opposite sides of the piston, directional control means mounted for reciprocal movement in the bore and operative in one position to interconnect the intake conduit means with the first conduit means and the drain conduit means with the second conduit means, and said directional control means being operative in a second position to interconnect the intake conduit means with the second conduit means and the drain conduit means with the first conduit means, bleed means operative to control the amount of fluid returned to the source connected into the drain conduit means, and feed control means operative to shut off the return of fluid to the source connected into the drain conduit means between the bleed means and said source.

8. The device as set forth in claim 7 in which the valve body includes a third bore, the drain conduit means is connected through the third bore, and the bleed means comprises a cock having a variable bleed orifice mounted within the third bore and operative upon rotation to deliver varying amounts of fluid to the feed control means.

9. The device as set forth in claim 7 in which the valve body includes a fourth bore, the drain conduit means is connected through the fourth bore, and the feed control means comprises a spool mounted within the fourth bore operative to open and close the drain conduit means.

10. In a device for controlling the movements of machine tools and the like, a source of hydraulic fluid; a valve body including a bore; a first directional spool mounted in one end of the bore for reciprocal movement between first and second positions, said first directional spool including first and second spaced sections of reduced diameter; an intake conduit connected between the source and the bore in position to deliver fluid to the first reduced section of the first directional spool when in first position; pressure generating means connected into the intake conduit to deliver fluid to the bore under pressure; a hydraulic cylinder including a piston mounted therein for reciprocal movement between the front and rear ends thereof; a first conduit connected between the front end of the cylinder and the bore in position to receive fluid from the first section of the first directional spool when in first position; a second directional spool mounted in the other end of the bore for reciprocal movement between first and second positions, said second directional spool including first and second spaced sections of reduced diameter; a second conduit connected between the rear end of the cylinder and the first reduced section of the second directional spool when in first position; a third conduit connected between opposite ends of the bore communicating the second reduced section of the first directional spool when in first position with the first reduced section of the second directional spool when in first position; a first drain conduit connected between the source and the bore at a point between the first and second directional spools; a fourth conduit connected between the first drain conduit and the second reduced section of the second directional spool when in first position; a second drain conduit connected between the source and the second reduced section of the first directional spool when in first position; and, means for regulating the amount of fluid returned to the source connected into the second drain conduit, the first directional spool when moved to second position being operative to connect the intake conduit to the fourth conduit through the first reduced section thereof while cutting off said intake conduit from the first conduit, and to connect said first conduit with the second drain conduit and the third conduit through the second reduced section thereof, and said second directional spool when in second position being operative to connect the second conduit to the fourth conduit through the second reduced section thereof while cutting off the third conduit from the second conduit.

11. The device as set forth in claim 10 in which, the valve body includes a second bore; a by-pass spool is mounted in the second bore for reciprocal movement between first and second positions, said by-pass spool including first and second spaced sections of reduced diameter; and, the first and second conduits are divided by the second bore into first and second sections, said by-pass spool being operative in first position to connect the first and second sections of the first conduit through the first reduced section thereof and to connect the first and second sections of the second conduit through the second reduced section thereof, and said by-pass spool being operative in second position to cut off the first and second sections of the first conduit from one another and to cut off the first and second sections of the second conduit from one another while cutting off the first sections of the first and second conduits from one another and connecting the second sections of the first and second conduits to one another.

12. The device as set forth in claim 10 in which the means for regulating the amount of fluid returned to the source through the second drain conduit comprises a variable bleed orifice and a feed shut-off spool arranged in series with said shut-off spool downstream of said orifice.

References Cited in the file of this patent
UNITED STATES PATENTS

| | | |
|---|---|---|
| 1,965,261 | Schulte | July 3, 1934 |
| 2,091,425 | Wood | Aug. 31, 1937 |
| 2,127,877 | Maglott | Aug. 23, 1938 |
| 2,176,985 | Arms | Oct. 24, 1939 |
| 2,251,961 | Snader | Aug. 12, 1941 |
| 2,271,615 | Bauer | Feb. 3, 1942 |
| 2,367,492 | Frickett | Jan. 16, 1945 |
| 2,774,192 | Grobey | Dec. 18, 1956 |
| 2,798,460 | Mathys | July 9, 1957 |